Sept. 29, 1953     F. H. WHITELEY     2,653,508
INTERMITTENT FEED MECHANISM UTILIZING
CONTROL MARKINGS ON FILM Filed Feb. 7, 1949     4 Sheets-Sheet 3

INVENTOR.
Fred Howard Whiteley
BY
ATTORNEY

Patented Sept. 29, 1953

2,653,508

UNITED STATES PATENT OFFICE 2,653,508

INTERMITTENT FEED MECHANISM UTILIZING CONTROL MARKINGS ON FILM

Fred Howard Whiteley, Kansas City, Kans.

Application February 7, 1949, Serial No. 74,958

7 Claims. (Cl. 88—18.2)

This invention relates to the production and projection of motion pictures, the primary object being to provide a method and apparatus for creating a film strip adapted for use with an improved projector capable of intermittently moving successive frame images into a projecting position while simultaneously reducing flicker and other errors of projection that become particularly magnified upon employment of dual lens systems.

Reference is made to my co-pending application Serial No. 616,678, filed September 17, 1945, entitled "Motion Picture Projecting System," now Patent No. 2,460,864, issued February 8, 1949, wherein is disclosed a system and method for motion picture projection having a particular shutter mechanism formed to eliminate flicker. There was provided therein the conventional film-advancing structure utilizing Geneva gearing and, while the flickerless objects were obtained, such gearing arrangement is incapable of eliminating jumping or pulsating of the images on the screen and is unsatisfactory for attaining stereoscopic projection if desired.

As will hereinafter appear, one form of shutter mechanism forming the subject matter of my co-pending application is embodied within the present invention, but the most important object hereof is to provide structure usable in conjunction with such shutter system and capable of moving strip film for projection purposes with a high degree of accuracy and to such an extent that the human eye will be unable to detect any projection errors or discrepancies.

Another important object of the present invention is to provide a motion picture projecting system having structure for intermittently advancing the film and control means for such structure, all formed for high precision and accuracy and capable to so operate with such precision as to virtually remove the hazards of inaccuracies with respect to the formation of the component parts of the actuating mechanism, per se.

It is an important object of the present invention to first provide a film strip having thereon uniformly-spaced, opaque patterns for the purpose of controlling the operation of the film-advancing mechanism of the projector upon interception of a beam of light forming a part of the projector and directed toward a plurality of photo electric cells operably coupled with the film-advancing mechanism.

A further object of the present invention is to provide a camera capable of automatically forming the film strip with the indicating patterns thereon as the camera is placed in use to produce the series of frame images.

A still further object of the present invention is to provide in a projector, film-advancing mechanism including parts engageable with the film, and a continuously-rotating drive shaft common to all films and all means engageable therewith, together with a plurality of electrically-controlled clutches operable intermittently to interconnect the rotating drive shaft and the film-contacting means, the clutches being coupled within an electric circuit and in controlled relationship to the above-mentioned photo electric cells.

Another object of this invention is to provide a projector having means utilizing certain of the photo electric cells for positively keeping the film strip guided through a predetermined, substantially rectilinear path of travel, as the same passes from a conventional storage reel to the take-up reel of the projector.

Another object of the present invention is to provide means for holding the film strip in a slightly taut condition across the film holder or gate forming a part of the projector.

It is well known to those skilled in this art that ideal motion picture projection to eliminate flicker and/or to provide for stereoscopic projection necessitates the use of two or more lens systems. When such dual systems are used, however, the errors of projection are highly magnified with a resulting jumping or pulsating of the images on the screen, the latter of which is even more distressing to the observer than the flicker ordinarily produced by conventional projectors.

No greater accuracy is necessary than that detectable by the human eye, but so far as I am aware, no system has heretofore been perfected that is capable of not only eliminating flicker but capable of reducing image pulsations to the extent of making plural-lens projection systems practical.

Conventional film-advancing mechanisms used in present-day projectors are unable to correct for inaccuracies in recording of the film images by the camera; cannot correct for errors made during the process of printing; are unable to compensate for discrepancies due to film wear during use, particularly in the perforations thereof or in error with respect to the manufacture of the film itself and the production of the perforations thereof.

The usual movements, including Geneva gearing, cannot correct for expansion and contraction of the film due to temperature variations and are unable to reduce errors caused by shrinking and warping of the film as the same ages. Finally, the conventional film-actuating mechanisms, per se, irrespective of how precisely manufactured, produce inaccuracies in projection, resulting in unsatisfactory orthographic projection and impractical stereoscopic projection.

The system about to be described has been produced to eliminate the disadvantages above set forth and to accomplish the aims and objects initially outlined herein. Additionally, as will hereinafter be made clear, when the system is placed in use, life of the film strip, per se, will be appreciably increased because of the way in which the extent of friction to which the film itself is exposed during the projection, is drastically reduced.

To this end, the projector hereof is capable of operation with a minimum of strain on the film due to friction at the film gate itself, thereby reducing film breakage, said film gate being particularly formed to eliminate contact with the emulsion face of the film. It will be seen that deterioration of the component parts of the actuating mechanism forming a part of the projector about to be described will have no effect upon the accuracy of the system. Further, because of the reduction in the amount of precision required in the manufacturing of the film-advancing mechanism, the over-all cost of production will be appreciably decreased.

Figure 1:
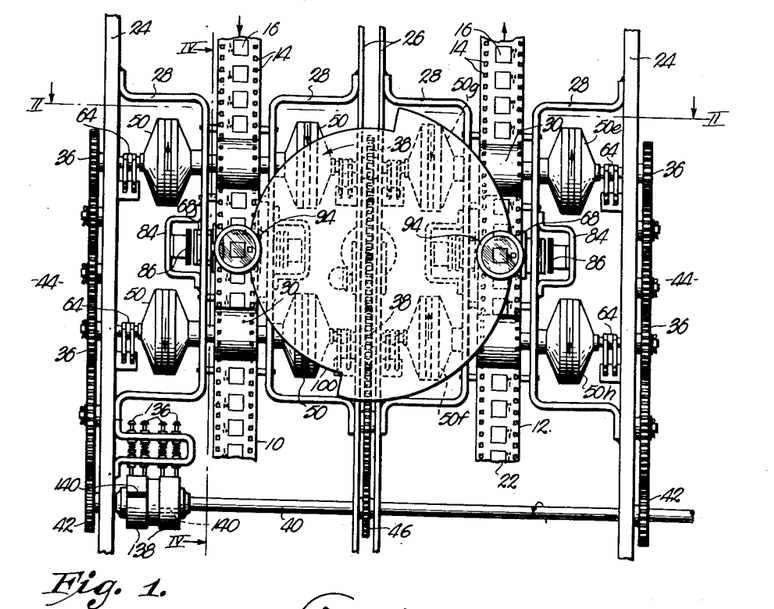
Fig. 1 is a fragmentary, front elevational view, showing diagramatically a portion of a motion picture projector made in accordance with my present invention and capable of utilizing the method of projecting motion pictures also forming a part of the invention.
Figures 2, 6:
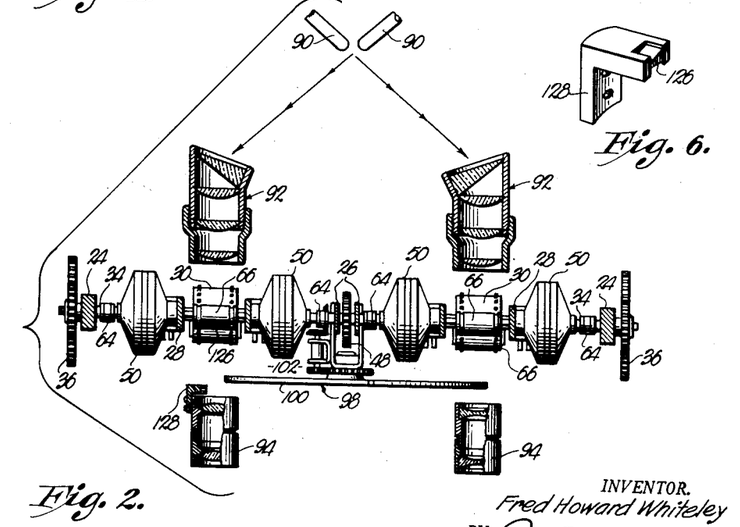
Fig. 2 is a cross sectional view taken on line II—II of Fig. 1, looking in the direction of the arrows.
Fig. 6 is a perspective view of a prism usable with one lens of the dual lens system herein disclosed.
Figures 9, 10:
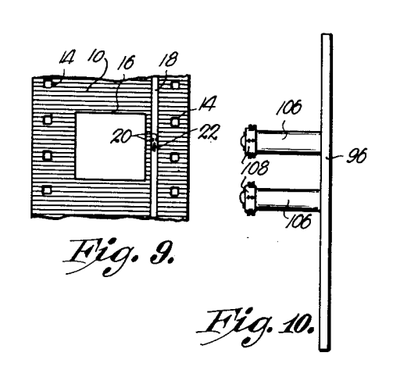
Fig. 9 is an elevational view showing a fragmentary portion of the strip film as the same appears ready for projection.
Fig. 10 is an edge view of the image-receiving screen to be used with the system.

In Figs. 1 and 2, there is shown a pair of identical film strips 10 and 12 each formed as detailed in the enlarged view thereof in Fig. 9. These film strips 10 and 12 are of conventional character from the standpoint of having a row of perforations 14 along each marginal edge respectively thereof and having a number of spaced image frames 16 throughout its length. Obviously, the frames 16 are surrounded by opaque areas; but, in the film strips 10 and 12 to be used with the present system, such opaque areas are interrupted by a transparent, longitudinally extending band 18 along one marginal edge of the film strips. As shown in Fig. 9, this elongated band 18 is disposed between one row of perforations 14 and the frame images 16.

An opaque pattern alongside each frame 16 respectively interrupts the transparency of band 18, said pattern constituting a pair of opposed ears 20 extending inwardly from the longitudinal edges of the band 18. This pattern, also, includes an elongated portion 22 centrally disposed with respect to the marginal edges of band 18 and arranged in slightly spaced relationship to the opposed ears 20. Structure for modifying a conventional camera to produce the band 18 and its opaque pattern 20—22 is illustrated in Figs. 14 to 18, inclusive, and will hereinafter be fully explained.

The projector mechanism illustrated in Fig. 1 includes a pair of spaced-apart, vertical frame members 24 having spaced-apart frame pieces 26 arranged midway therebetween. Each frame member 24 and each frame piece 26 is provided with an inwardly-extending, U-shaped bracket 28 secured directly to the innermost faces thereof. Each film strip 10 and 12 is provided with a pair of spaced-apart, drum-like drive sprockets 30 mounted between the bights of opposed brackets 28 in the manner detailed in Fig. 12.

Each sprocket 30 is provided with a tubular hub 32 that is journalled within the brackets 28 and extends a distance therethrough. A shaft 34 is provided for each end respectively of the tubular sleeve 32, one end of shaft 34 being telescoped within hub 32 for free, relative movement thereto. The opposite end of each shaft 34 is journalled in frame members 24 or frame pieces 26, as the case may be.

The ends of all shafts 34 opposite to the corresponding hubs 32 that are journalled within the frame members 24 have a gear 36 affixed thereto. The proximal ends of the shafts 34 that pass through and are journalled in frame pieces 26 are interconnected by a common gear 38. Obviously, if desired, the two shafts 34 joined by gears 38 could be formed as a single unit.

A drive shaft 40 journalled in suitable bearings formed in frame members 24 and frame pieces 26 is driven in any suitable manner as by an electric motor (not shown). A pair of gears 42 is mounted on the shaft 40 exteriorly of the frame members 24, and a train of gears, broadly designated by the numeral 44, connects each gear 42, respectively, with the gears 36. The shaft 40, also, carries a gear 46 between the frame pieces 26 that is joined with the two gears 38 by means of a train of gears broadly designated by the numeral 48. Thus, all of the shafts 34 are driven by the common drive shaft 40.

There is provided a clutch broadly designated by the numeral 50 for each end respectively of each hub 32. These clutches 50 are identical and include a hollow housing comprising a pair of opposed, cup-like sections 52 and a centrally-perforated ring 54 disposed between sections 52 and integrally joined therewith. The sections 52 and 54 of the housing 50 circumscribe the corresponding shaft 34, and the section 52 is provided with a collar 56 that surrounds hub 32 and is secured theerto by means of a set screw 58 or the like.

Figure 12:
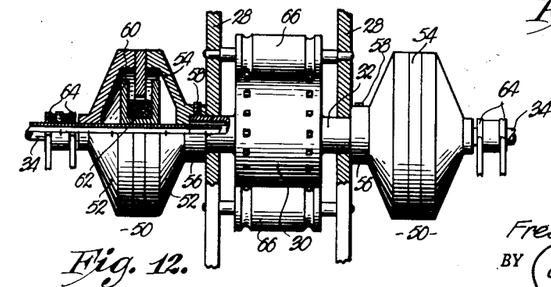
Fig. 12 is an enlarged, detailed, fragmentary view of one of the film-contacting sprocket assemblies, together with the corresponding electro-clutches therefor, parts being broken away and in section for clearness.

A core 60 within the housing 50 is U-shaped in cross-section, as illustrated in Fig. 12, and is secured directly to the shaft 34 in any suitable manner (not shown) and is disposed in embracing relationship with a portion of the ring 54. Each core 60 has an electric coil 62 wound thereabout but spaced from the walls of the central perforation of ring 54. Housing 50 is filled with a liquid having megnetic particles suspended therein.

It is thus seen that, with coil 62 de-energized, rotation of shaft 34 also rotates core 60 and coil 62 while the sections 52 and 54 of housing 50, together with the corresponding sprocket drum 30, remains stationary. Suitable conductors (not shown) pass from the coil 62 through shaft 34 for connection with slip rings 64 in the conventional manner.

Figures 3, 4, 5:
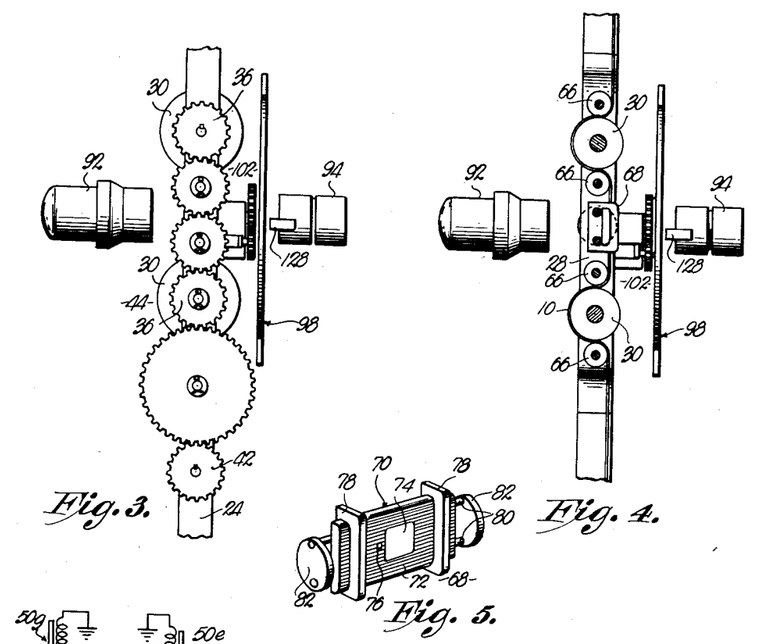
Fig. 3 is an end elevational view of the structure illustrated in Fig. 1.
Fig. 4 is a cross sectional view taken on line IV—IV of Fig. 1, looking in the direction of the arrows.
Fig. 5 is a perspective view of a film holder or gate forming a part of the projector, showing the same entirely removed from said projector.

Fig. 4 of the drawings illustrates the way in which the film strips 10 and 12 are threaded under the two sprockets 30. Each sprocket 30 has a pair of idler rollers 66 journalled for rotation in the brackets 28, as illustrated in Fig. 12, and disposed to hold the film strips 10 and 12 tightly against the sprockets 30.

A film gate or holder 68 of the kind illustrated in Fig. 5 is disposed between each pair of sprockets 30, respectively, thus providing a gate for each film strip. Gate 68 includes a rectangular-shaped plate 70 of initially transparent material having a coating 72 of any suitable substance to render the plate 70 opaque with the exception of an area 74 corresponding in size and shape to the image frames 16 of film strips 10 and 12 and a smaller area 76 of a size and disposition to clear the pattern 20—22 in transparent area 18 of film strips 10 and 12.

Plate 70 extends through openings formed in a pair of spaced-apart supporting members 78, and a pair of pins 80 likewise extend through the members 78 in underlying relationship to the plate 70 and tightly thereagainst to hold the elements 70, 78 and 80 of gate 68 together as a unit. Each of the ends respectively of the pins 80 is provided with a disc 82 formed from any metallic material capable of magnetic attaction for purposes hereinafter to be explained.

As shown in Figs. 1 and 4 of the drawings, the gate 68 is disposed between corresponding brackets 28 with the pins 80 slidably mounted therein and with the metallic discs 82 on that side of brackets 28 disposed outwardly from the respective film strip 10 or 12. A small bracket 84 on each bracket 28 respectively carries an electro-magnet 86 next adjacent each of the four metallic discs 82.

Figure 11:
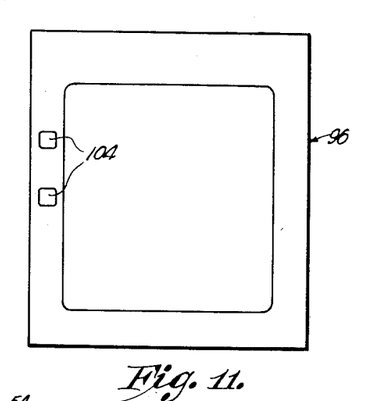
Fig. 11 is a front elevational view of said screen.

A light source 90 is provided for each film strip 10 and 12 respectively disposed to direct a beam of light as indicated in Fig. 2 of the drawings through a condenser lens system 92. Such beam of light thereupon passes through the areas 74 and 76 of gate 68, thence through an image frame 16 and the transparent band 18 of the film strip and, finally, through lens 94 disposed on that side of the film strips opposite to lens system 92 for projection upon a screen 96 (Figs. 10 and 11).

It will be noted that films 10 and 12 are threaded through the projector oppositely and for travel in opposite directions and, therefore, the two lenses 94 are reversed as indicated in Fig. 2. A shutter plate 98 common to the two film strips 10 and 12 is interposed between the latter and lenses 94. Shutter plate 98 takes the form of a circular disc cut away as at 100 substantially 180° therearound.

Shutter plate 98 is driven by a train of gears 102 operably interconnected with the centrally-disposed train of gears 48 that have connection with gear 42 on drive shaft 40. The operation of the shutter plate 98 need only be explained briefly herein, since the same forms no part of this invention and is the same as one of the modifications of my aforesaid co-pending application.

A constant and complete illumination of the projection screen 96 is insured through the use of shutter plate 98; and it will be noted that, when shutter plate 98 is in the position illustrated in Figs. 1 and 2, one of the lenses 94 is completely covered, while the other lens 94 is exposed to the beam of light emanating from the corresponding source 90.

As shutter plate 98 rotates in the direction of the arrow indicated in Fig. 1 substantially 90°, the lower half only of the two images on the film strips 10 and 12 will be projected upon screen 96. As shutter plate 98 rotates another 90°, the image on film strip 12 only will be projected; and, finally, as shutter plate 98 rotates another 90°, the upper half of the two images will be projected.

Thus, a "peeling" of the projected image occurs, and screen 96 is constantly and completely illuminated during the course of the complete projection of all images upon the film strips 10 and 12. Obviously, this operation of the shutter plate 98 is synchronized precisely with the intermittent movement of film strips 10 and 12 through the advancing structure forming the subject matter hereof.

Figure 7:
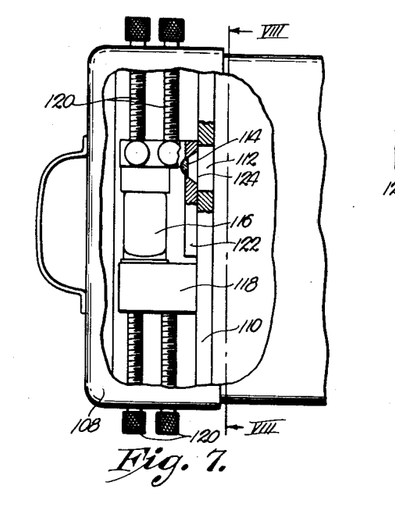
Fig. 7 is a fragmentary, side elevational view of a holder for photo electric cells and lens used therewith, parts being broken away to reveal details of construction.

The projection screen 96 is provided with a pair of openings 104 adjacent one marginal edge thereof, each of which openings 104 is provided a hollow housing 106 that is in register with such openings 104 and provided with a removable cap 108 closing that end thereof opposite to screen 96. The housings 106 and their contained parts are identical, and only one need be explained through reference to Figs. 7 and 8.

Figure 8:
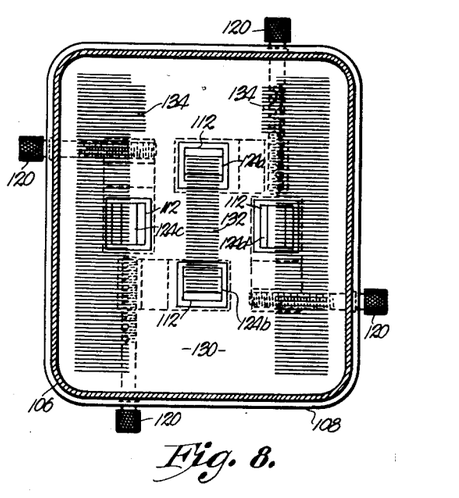
Fig. 8 is a transverse, cross sectional view taken on line VIII—VIII of Fig. 7.

Cap 108 has a transverse partition 110 provided with four openings 112 arranged as indicated in Fig. 8. A lens 114 is positioned behind each opening 112 respectively, and a photo electric cell 116 within cap 108 is disposed in alignment with each lens 114 respectively. A block 118 carried by a pair of adjusting screws 120 extending into the cap 108 mounts not only the corresponding photo electric cell 116 but a plate 122 for each of the corresponding lenses 114.

It is to be noted that openings 124 through plate 122 exposing lenses 114, which openings 124 are in register with openings 112 of partition 110, are rectangular, whereas the openings 112 are substantially square. As shown in Fig. 8, two of these rectangular openings 124 have their longitudinal axes horizontal, whereas another pair of openings 124 have their longitudinal axes vertical. The ends of openings 124 are in juxtaposition with the corresponding sides of openings 112, while the longitudinal edges of openings 124 are spaced from the proximal edges of the corresponding opening 112.

The beams of light emanating from lamps 90 and passing through the transparent bands 18 of film strips 10 and 12 enter the openings 104 of screen 96 and the housing 106 to illuminate the partition 110 in the manner illustrated in Fig. 8. To the end that each beam of light is directed to a corresponding opening 104, there is provided a prism 126 (Fig. 6) mounted in an L-shaped bracket 128 that is, in turn, secured to one of the lenses 94, as shown in Fig. 2. This prism 126 serves to deflect one of the beams of light so that both beams will not pass through the same opening 104.

For purposes of clarity, the illuminated area on partition 110 (Fig. 8) is designated by the numeral 130. The elongated shaded area on partition 110 caused by the opaque portion 22 of the transparent band 18 is designated by the numeral 132, and the opposed shaded portions on partition 110 that are caused by the ears 20 of the transparent band 18 are both designated by the numeral 134.

To further aid in the explanation of the operation of the projection system hereof, the uppermost opening 124 is designated as 124a; the lowermost opening 124 as 124b; the opening 124 to the left in Fig. 8 as 124c; and the opening 124 to the right in viewing Fig. 8 as 124d. In the same manner, in Fig. 13, the four photo electric cells 116 are designated as 116a, 116b, 116c and 116d, to correspond with openings 124a, 124b, 124c and 124d respectively.

Figure 13:
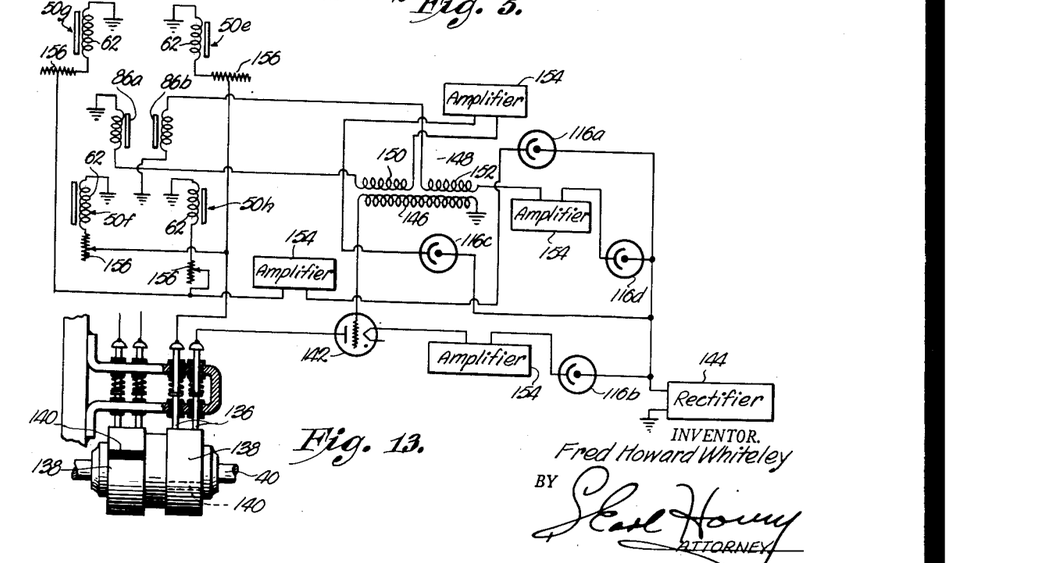
Fig. 13 is a schematic wiring diagram, showing the electrical circuit forming a part of the projector.

Incidentally, the wiring diagram of Fig. 13 shows only one of the two circuits that is used for the advancing assembly for film strip 12. Also, since there are four clutch assemblies 50 for each of the two circuits, the assemblies for film strip 12 are identified in Figs. 1 and 13 as 50e, 50f, 50g and 50h respectively.

When the projector is placed in operation, the drive shaft 40 continuously rotates in the direction of the arrow in Fig. 1. Also, the two circuits, one of which is shown in Fig. 13, are both closed by provision of a pair of spaced apart, spring-loaded switch plungers 136 that are biased against an electric bridging drum 138 mounted on shaft 40. A relatively narrow band 140 of non-conducting material on each of the drums 138 momentarily breaks the two switching plungers 136 during each revolution of the drum 40.

It is to be noted that these two non-conducting bands 140 are diametrically-opposed, to the end that one film strip is always stationary while the other advances. Obviously, if coils 62 of all four clutches 50 receive the same amount of current when the circuit therefor is energized, a balanced condition will exist; and the two sprockets 30 for the film strip 10 or 12, as the case may be, will remain in a standstill position.

It is seen, as indicated by the arrows in Fig. 1, that the clutches 50e and 50f will rotate in one direction when connected with the gear trains 48 and 44 respectively, whereas the clutches 50g and 50h will rotate in the opposite direction when operably joined with the respective gear trains 48 and 44, respectively. Consequently, if more current is directed to the coils 62 of clutches 50g and 50h, then to the clutches 50e and 50f, the film strip 12 will move in the direction of the arrow at the uppermost end of film strip 12, as shown in Fig. 1.

Prior to each advancing step of the film, the drum 138 of shaft 40 is in a position to maintain switches 136 in bridged relationship, the film strip being stationary and having an image frame disposed on the gate 68 for projection upon screen 96. When in this position, the pattern on the partition 110 is as illustrated in Fig. 8. As shaft 40 continues to rotate, driving all of the gear trains 44 and 48, as well as the shutter plate 98, the non-conducting band 140 will move to a position breaking momentarily the switches 136.

It is to be noted in Fig. 13 that the two switches 136 are in series with the coils 62 of clutches 50e and 50f, with a tube 142, with photoelectric cell 116b and with a rectifier 144 having connection with a source of electrical energy (not shown). Tube 142 is a suitably chosen, gas-filled thyratron and has its grid connected with a secondary winding 146 of a transformer 148.

Once this series circuit is broken, current will not flow through photoelectric cell 116b and the coils 62 of clutches 50e and 50f, irrespective of the rebridging of switch plungers 136 and the energization of photoelectric cell 116b by light, until tube 142 is again fired to ionize the gas contained therein.

As shown in Fig. 8, the shaded area 132 is narrower than the lengths of openings 124 and permits exposure of photoelectric cells 116a and 116b at both ends of openings 124a and 124b to the same amount of light emanating from source 90. By the same token, the illuminated area 130 covers substantially half of the openings 124c and 124d and, consequently, the same amount of light is directed to photoelectric cell 116c as to the photoelectric cell 116d.

When the clutches 50e and 50f are rendered inoperable through de-energization of their respective coils 62, as just above described, the two clutches 50g and 50h still being in partial connecting relationship with their respective shafts 34 because of light passing to cell 116a at the sides of area 132, will commence immediately to rotate the two sprockets 30, thereby advancing the film strip 12 in the direction indicated by the arrow in Fig. 1. Conversely, when the circuit corresponding to film strip 10 is broken momentarily by the interengagement of its non-conducting band 140 with switches 136, the film strip 10 will move in the opposite direction, as indicated in Fig. 1.

As shaded area 132 commences to move upwardly, as indicated in Fig. 8, more of the opening 124b will be exposed to light; and, when opening 124b is completely so exposed, photoelectric cell 116b will receive the full amount of light that is permitted to pass by opening 124b. This, of course, will have no effect upon the operation because, as above set forth, current does not flow through photoelectric cell 116b until tube 142 is fired.

However, when shaded area 132 moves to a position exposing fully the opening 124a, the photoelectric cell 116a will become fully conducting, thereby supplying additional current to the coils 62 of clutches 50g and 50h. It is to be noted in Fig. 13 that these last-mentioned clutches are in series with photoelectric cell 116a that is, in turn, connected with rectifier 144.

As the opposed, shaded areas 134, shown in Fig. 8, continue to move upwardly, another pair of such areas 134 will move into full covering relationship to the openings 124c and 124d. It is to be remembered at this point that the transparent band 18 of each film strip is provided with a series of the patterns 20—22, there being one such pattern for each image frame 16.

When the openings 124c and 124d become completely blocked against passage of light from source 98, the two photoelectric cells 116c and 116d will momentarily produce no current whatsoever. Fig. 13 shows the way in which photoelectric cells 116c and 116d are connected directly to sections 150 and 152, respectively, of the primary winding of transformer 148.

Transformer 148 will thereupon become momentarily de-energized and, since tube 142 has its grid connected directly with the secondary 146 of transformer 148, tube 142 will fire because of a positive charge upon its grid, its contained gas will become ionized and the circuit therethrough, as well as through photoelectric cell 116b and through the windings 62 of clutches 50e and 50f, will be energized.

At the time of firing of tube 142, and while the openings 124c and 124d are completely blocked from light passage, the next following shaded area 132 will have moved into position substantially covering the opening 124b. Accordingly, photoelectric cell 116b will not produce full current for operation of the clutches 50e and 50f, but the photoelectric cell 116a, still being fully exposed to light, will continue to cause full operation of clutches 50g and 50h and the film strip 10 will continue to move.

As the succeeding shaded area 132 continues to move upwardly, as shown in Fig. 8, it will gradually move into substantially covering relationship with the opening 124a to block full light exposure to the photoelectric cell 116a; and, as the latter produces less current, the clutches 50g and 50h will gradually release their connection with the corresponding shafts 34. Finally, when the shaded areas 132 and 134 assume the position of Fig. 8, all parts will return to equilibrium and the film strip 10 will become stationary.

It is to be noted in Fig. 13 that, if desired, an amplifier 154 may be provided for each clutch 50, respectively, to produce sufficient current to operate the same. There is, also, shown in Fig. 13 a variable resistance 156 for each clutch 50, respectively.

It is obvious that if all four photoelectric cells 116 produce the same amount of current, the action of the two clutches 50e and 50f or tendency to move the film strip in one direction will be offset by the same tendency of the clutches 50e and 50f to move the strip in the opposite direction when the circuit of Fig. 13 is fully energized during the period of time when plunger switches 136 are bridged.

It is desirable, however, to maintain these film strips in a slightly stretched or taut condition across film holder 68. Through proper adjustment of the four resistances 156, such holding of the film strips in a taut condition can be accomplished. In other words, through a slight unbalance, the four clutches can be made to operate in tending to move the film strip in opposite directions, but such tendency should not be so great as to cause damage to the films.

The above-mentioned pair of electro-magnets 86 on each side of the film holder 68 is, also, shown in Fig. 13 and, for purposes of clarity, are designated as 86a and 86b. Electro-magnet 86a is coupled in series with photoelectric cell 116c through one of the amplifiers 154 and section 150 of the primary winding of transformer 148. In the same manner, the electro-magnet 86b is coupled in series with section 152 of transformer 148, another of the amplifiers 154 and the photoelectric cell 116d.

Since the two photoelectric cells 116c and 116d are always normally balanced because of the fact that an equal amount of the openings 124c and 124d are exposed to light, and both of these openings are fully blocked when the opposed shaded areas 134 move in covering relationship thereto, the two electro-magnets 86a and 86b will, also, be in balanced relationship.

Accordingly, if for any reason the film strips do not move in a true rectilinear path through the respective film holders 68, they will be immediately guided back to position by the operation of electro-magnets 86a and 86b.

To explain this operation, suppose that film 10 has shifted to the right as viewed in Fig. 1, moving gate 68 toward electro-magnet 86b and away from electro-magnet 86a. This will expose additional light to cell 116c and less to cell 116b. The additional current furnished magnet 86a and decrease of current to magnet 86b will cause the gate 68 to be pulled back to the left. Obviously, this action has no effect on tube 142 even when the latter is de-ionized because a flux change in one direction between windings 152 and 146 of transformer 148 will be offset by an opposite flux change between windings 150 and 146.

By the same token, shaded areas 134 are sufficiently large to assure firing of tube 142 when they move over openings 124c and 124d, though the film may be slightly out of alignment.

Figures 14, 15, 16, 17, 18:
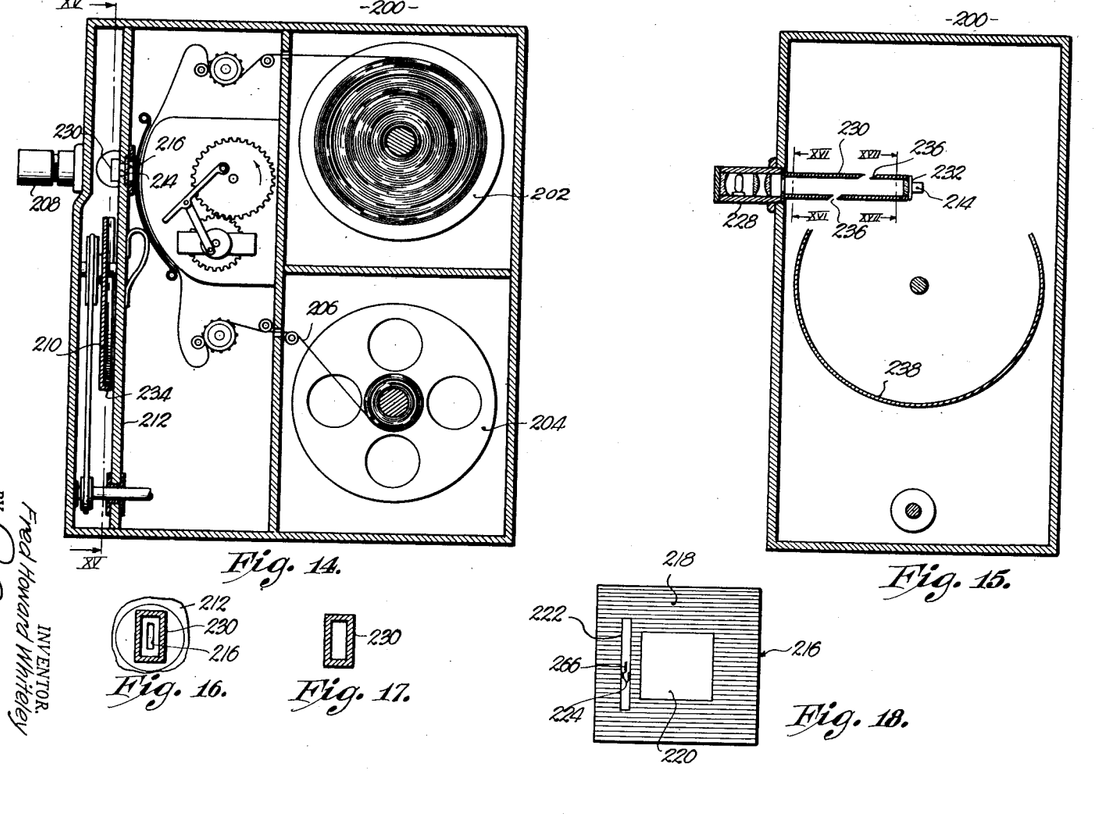
Fig. 14 is a vertical, cross sectional view through a conventional camera, illustrating the necessary modification thereof to adapt the same to produce a film strip of the type shown in detail in Fig. 9.
Fig. 15 is a cross sectional view taken on line XV—XV of Fig. 14.
Fig. 16 is a cross sectional view taken on line XVI—XVI of Fig. 15.
Fig. 17 is a cross sectional view taken on line XVII—XVII of Fig. 15.
Fig. 18 is an elevational view of a plate to be used with the camera illustrated in Figs. 14 and 15 for producing the film strip to be used with the system embodied by this invention.

The manner of producing the controlling means for the projector just described, upon the film strips, may be accomplished in a simple manner by modifying conventional cameras, as indicated in Figs. 14 to 18 inclusive. In Figs. 14 and 15, there is shown one type of conventional camera having a case broadly designated by the numeral 200, wherein is mounted in the usual manner a wind-off reel 202 and a take-up reel 204 for a film 206.

A conventional lens system 208 forms a part of such camera and a shutter 210 is mounted for rotation within the case 200 between that wall thereof having lens 208 thereon and a partition 202 within case 200. An opening 214 in partition 212 is an alignment with the lens 208.

For the purposes of this invention, there is provided a flat plate 216, preferably made from an initially transparent material and having one face thereof coated with any substance to produce an opaque area 218 on plate 216. Plate 216 has a transparent area 220 corresponding in shape and size to the frames to be produced on film 206 and a second transparent area 222 takes the form of an elongated strip and is disposed between one marginal edge of plate 216 and the transparent area 220.

A pattern constitutes a pair of of opposed, opaque ears 224 and an elongated, centrally-disposed, rectangular portion 226. As shown in Fig. 18, this pattern 224—226 is disposed alongside the transparent area 220 and intermediate the ends of the transparent band 222. Plate 216 is mounted within the camera 200 upon partition 212 between the film 206 and the proximal wall of partition 212.

The opening 214 in the partition 212 is T-shaped and sufficiently large to expose both areas 220 and 222. Auxiliary light is introduced to the elongated, transparent area 222 of plate 216 through the medium of lens 228 communicating with the space between partition 212 and the proximal wall of case 200. This lens 228, in turn, communicates with an elongated, tubular member 230 of rectangular cross section as shown; and the innermost end of this tubular member 230 is closed by a prism 232 formed to reflect light entering lens 228 toward the transparent band 222.

The shutter 210 is modified by providing a peripheral lateral flange 234 that passes through opposed, offset openings 236 formed in the tubular member 230 each time the shutter 210 blocks the lens 208. Accordingly, each time the film strip 206 is advanced, the interior of the camera is blocked from light entering both lenses 208 and 228. It is obvious that the finished film will not only have the series of frame images thereon but will have a continuous, transparent band 18, as indicated in Fig. 9 of the drawings that is interrupted by the series of opaque patterns 20—22 thereon.

It is contemplated that to the end that uniformity may be accomplished in producing films for use with the projector hereof, plates 216 be produced by first making a master and duplicating the same by the usual photographic processes.

It is obvious that the circuit for controlling the movement of film strip 10 is virtually the same as that shown in Fig. 13. However, since the film strip 10 moves oppositely to film strip 12, tube 142 must be in series with cell 116a rather than cell 116b. The conductors connecting the plates of cells 116a and 116b are therefore, simply interchanges.

Also, because of the use of oppositely operating lenses 94, the conductors for the plates of cells 116c and 116b are interchanged to attain proper operation of magnets 86a and 86b of film 10.

Manifestly, from the foregoing, there has been developed a system for not only producing a novel motion picture film but a new method of causing the same to be projected upon a screen in a manner to eliminate both flicker and, more particularly, pulsations or jumping of the image on the screen.

While the particular pattern that includes a continuous, transparent band and three opaque portions has been provided, it is apparent that the system could well be modified to accomplish the purposes herein by varying such pattern in a large number of ways. Broadly, the invention contemplates the use of photoelectric cells and suitable electro-magnetic means such as the clutching mechanism herein shown that may differ from that herein disclosed, together with means for intermittently changing the extent of light that is directed to such cells, all for the purpose of controlling the film movement.

In this connection, it is obvious that the means provided for guiding the film, i. e., the opposed ears of the film pattern, could be eliminated if desired while retaining the means for controlling the advancing mechanism; and, of course, conversely, the ears alone could be used if desired.

It is also, within the scope of this invention to reverse the procedure entirely by providing spaced-apart, transparent areas on the film in lieu of the spaced-apart, short, rectangular, opaque areas designated by the numeral 22.

In the same manner, the guiding of the film could be accomplished by providing a number of opposed pairs of transparent areas on the film instead of the opposed, opaque ears 20 that have herein been provided.

It is manifest, therefore, that many changes might well be made in details of construction, and those that fairly come within the broad aspects of the invention, as defined by the appended claims, are contemplated hereby.

Having thus described my invention, what is claimed as new and desired to be secured by Letters Patent is:

1. In a motion picture projector for use with a film strip having frame images and a series of alternate transparent and opaque areas throughout the length thereof, said projector including means for producing a beam of light; a plurality of electric circuits each having a photoelectric cell disposed to receive said beam of light; electrically operable structure for intermittently advancing said film strip with said opaque areas thereof intercepting said beam of light, said structure including a pair of devices rotatable in opposite directions, each device having electric clutch means for interconnecting the same with the film strip; and means coupling said circuits with each clutch means respectively for controlling the operation of the devices as passage of light to said cells varies in response to film strip movement, said coupling means for one of said circuits including structure for alternately making and breaking the one circuit and normally open switching means, there being an opaque area for controlling said switching means.

2. For use with a film strip having a series of image frames and an elongated, transparent area provided with a row of equally spaced, identical, opaque patterns extending longitudinally of the film strip, a motion picture projector for successively bringing said frames into positive alignment with the film gate of the projector in the direction of travel of the film strip, said projector including a rotatable device engaging the film strip for shifting the latter on its longitudinal axis across said gate; a continuously rotating drive element; a pair of clutches, each having a section provided with means connecting the same to said element for continuous rotation thereby in opposite directions, and a section connected with said device; electrical means for each clutch respectively for frictionally interconnecting the sections thereof; means on one side of said film strip for directing rays of light through said area thereof; a photoelectric cell for each of said electrical means respectively, each cell having an electric circuit coupling the same in series with its electrical means; a normally open switch means in one of said circuits; a third photoelectric cell having means coupling the same with said switch means for closing the latter; and switch means coupled with said drive element for periodically opening said one circuit, said cells being disposed on the opposite side of the film in alignment with said row of patterns within the path of travel of said light rays, said patterns having configurations, determined by the arrangement of said cells relative to each other for limiting the film strip to step-by-step, intermittent movement as the drive element rotates and as said patterns successively interrupt said light rays.

3. In the invention as set forth in claim 2, wherein said normally open switch means comprises an electron tube, and wherein is provided means for normally maintaining said tube inoperative when said third cell is receiving rays of light.

4. For use with a film strip having a series of image frames and an opaque marginal edge provided with an elongated, transparent area having a row of equally spaced, identical, opaque patterns extending longitudinally of the film strip, a motion picture projector responsive to the configuration of said patterns for intermittently advancing said film strip along a rectilinear path of travel to successively bring said frames into positive alignment with the film gate of the projector in the direction of travel of the film strip, said projector including a pair of opposed, electrical elements adapted to shift said film gate and the film therein in opposite directions transversely of said direction of travel of the film strip; a rotatable device engaging the film strip for advancing the latter across the gate; a continuously rotating drive element; a pair of clutches, each having a section provided with means connecting the same to said drive element for continuous rotation thereby in opposite directions, and a section connected with said device; electrical means for each clutch respectively for frictionally interconnecting the sections thereof; means on one side of said film strip for directing rays of light through said area thereof; a first pair of photoelectric cells, one for each of said electrical means respectively, each cell having an electric circuit coupling the same in series with its electrical means; a second pair of photoelectric cells, one for each electrical element respectively and operably coupled therewith; a normally open switch means in one of said circuits; means coupling one of said second pair of cells with said switch means for closing the latter; and switch means coupled with said drive element for periodically opening said one circuit, said cells being disposed on the opposite side of the film in alignment with said row of patterns within the path of travel of said light rays.

5. In the invention as set forth in claim 4, wherein said transparent area is elongated and extends longitudinally of the film strip to normally pass light rays in equal amounts to each of the second pairs of cells, whereby the electrical elements normally hold the gate substantially centered therebetween.

6. In a motion picture projector, film advancing mechanism including a film-engaging, rotatable device; a rotatable drive element; a pair of clutches each having a pair of sections, one section of each clutch being connected with said device; means for the other section of each clutch respectively connecting the same with said drive element for rotating said other sections in opposite directions, each clutch having structure frictionally interconnecting the sections thereof; and means for periodically releasing said structure for one of the clutches, whereby the film is advanced by the drive element through the other clutch.

7. In a motion picture projector having a picture gate, film advancing mechanism adapted to maintain the film taut in its direction of travel across said gate, said mechanism including a pair of spaced, rotatable devices engaging the film on opposite sides of the gate; a rotatable drive element; a clutch for each device respectively, each clutch having a pair of sections, one section of each clutch being connected with its device; means for the other section of each clutch respectively connecting the same with said drive element for rotating said other sections in opposite directions, each clutch having structure frictionally interconnecting the sections thereof; and means for periodically releasing said structure for one of the clutches, whereby the film is advanced by the drive element through the other clutch.

FRED HOWARD WHITELEY.

References Cited in the file of this patent

UNITED STATES PATENTS

| Number | Name | Date |
|---|---|---|
| 773,981 | Power | Nov. 1, 1904 |
| 1,057,234 | Green | Mar. 25, 1913 |
| 1,491,017 | Malm | Apr. 22, 1924 |
| 1,660,711 | Jenkins | Feb. 28, 1928 |
| 1,696,968 | Outrey | Jan. 1, 1929 |
| 1,713,663 | Kosken | May 21, 1929 |
| 1,847,988 | Semel | Mar. 1, 1932 |
| 1,855,775 | Shapiro | Apr. 26, 1932 |
| 1,921,494 | Wildhaber | Aug. 8, 1933 |
| 2,011,932 | Ives | Aug. 20, 1935 |
| 2,086,554 | Hoorn | July 13, 1937 |
| 2,341,098 | Hansen | Feb. 8, 1944 |
| 2,517,246 | Seitz et al. | Aug. 1, 1950 |
| 2,563,892 | Waller et al. | Aug. 14, 1951 |

FOREIGN PATENTS

| Number | Country | Date |
|---|---|---|
| 700,811 | France | Jan. 2, 1931 |
| 858,233 | France | May 6, 1940 |